United States Patent
Tongaonkar et al.

(10) Patent No.: US 9,479,405 B1
(45) Date of Patent: Oct. 25, 2016

(54) TRANSACTION BASED NETWORK APPLICATION SIGNATURES FOR TEXT BASED PROTOCOLS

(71) Applicant: Narus, Inc., Sunnyvale, CA (US)

(72) Inventors: Alok Tongaonkar, Sunnyvale, CA (US); Ram Keralapura, San Jose, CA (US); Antonio Nucci, San Jose, CA (US)

(73) Assignee: Narus, Inc., Sunnyvale, CA (US)

(*) Notice: Subject to any disclaimer, the term of this patent is extended or adjusted under 35 U.S.C. 154(b) by 742 days.

(21) Appl. No.: 13/724,779

(22) Filed: Dec. 21, 2012

(51) Int. Cl.
| G06F 15/16 | (2006.01) |
| H04J 14/00 | (2006.01) |
| H03M 13/00 | (2006.01) |
| H04L 12/26 | (2006.01) |
| H02M 7/48 | (2007.01) |
| G08G 1/0962 | (2006.01) |
| H04L 12/851 | (2013.01) |
| G06F 21/78 | (2013.01) |

(52) U.S. Cl.
CPC ............ H04L 43/04 (2013.01); *G06F 21/78* (2013.01); *G08G 1/0962* (2013.01); *H02M 7/4826* (2013.01); *H04L 47/2441* (2013.01)

(58) Field of Classification Search
CPC .......... H04L 41/0893; H04L 41/5029; H04L 41/0896; H04L 12/1485; H04L 47/2441; H04L 63/1408; H04L 27/2441; H02M 7/4826
USPC .................................................... 709/223, 224
See application file for complete search history.

(56) References Cited

U.S. PATENT DOCUMENTS

| 5,412,557 | A  | * | 5/1995  | Lauw ................. H02M 7/4826 363/132 |
| 7,644,150 | B1 | * | 1/2010  | Nucci et al. ................. 709/223 |
| 7,725,558 | B2 | * | 5/2010  | Dickenson ............. G06F 21/78 709/215 |
| 2002/0027511 | A1 | * | 3/2002 | Horita .................. G08G 1/0962 340/988 |
| 2005/0002335 | A1 | * | 1/2005 | Adamczyk ............ H04L 63/102 370/230 |
| 2008/0028273 | A1 | * | 1/2008 | Jeong .................. H03M 13/116 714/752 |
| 2008/0298250 | A1 | * | 12/2008 | Larsson ........................ 370/238 |
| 2010/0095367 | A1 | * | 4/2010 | Narayanaswamy ............ 726/12 |
| 2011/0287748 | A1 | * | 11/2011 | Angel et al. ................ 455/414.1 |
| 2012/0207133 | A1 | * | 8/2012 | Wong .............................. 370/331 |
| 2014/0064080 | A1 | * | 3/2014 | Stevens et al. ............... 370/235 |

\* cited by examiner

*Primary Examiner* — Arvin Eskandarnia
*Assistant Examiner* — Margishi Desai
(74) *Attorney, Agent, or Firm* — Kwan & Olynick LLP

(57) ABSTRACT

A method for profiling network traffic of a network. The method includes extracting cells from bi-directional payloads generated by a network application, wherein each cell comprises at least one direction reversal in a corresponding bi-directional flow, generating a cell group comprising a portion of the cells that are similar, analyzing the cell group to generate a signature of the network application, and classifying, based on the signature of the network application, a new bi-directional flow as being generated by the network application.

20 Claims, 8 Drawing Sheets

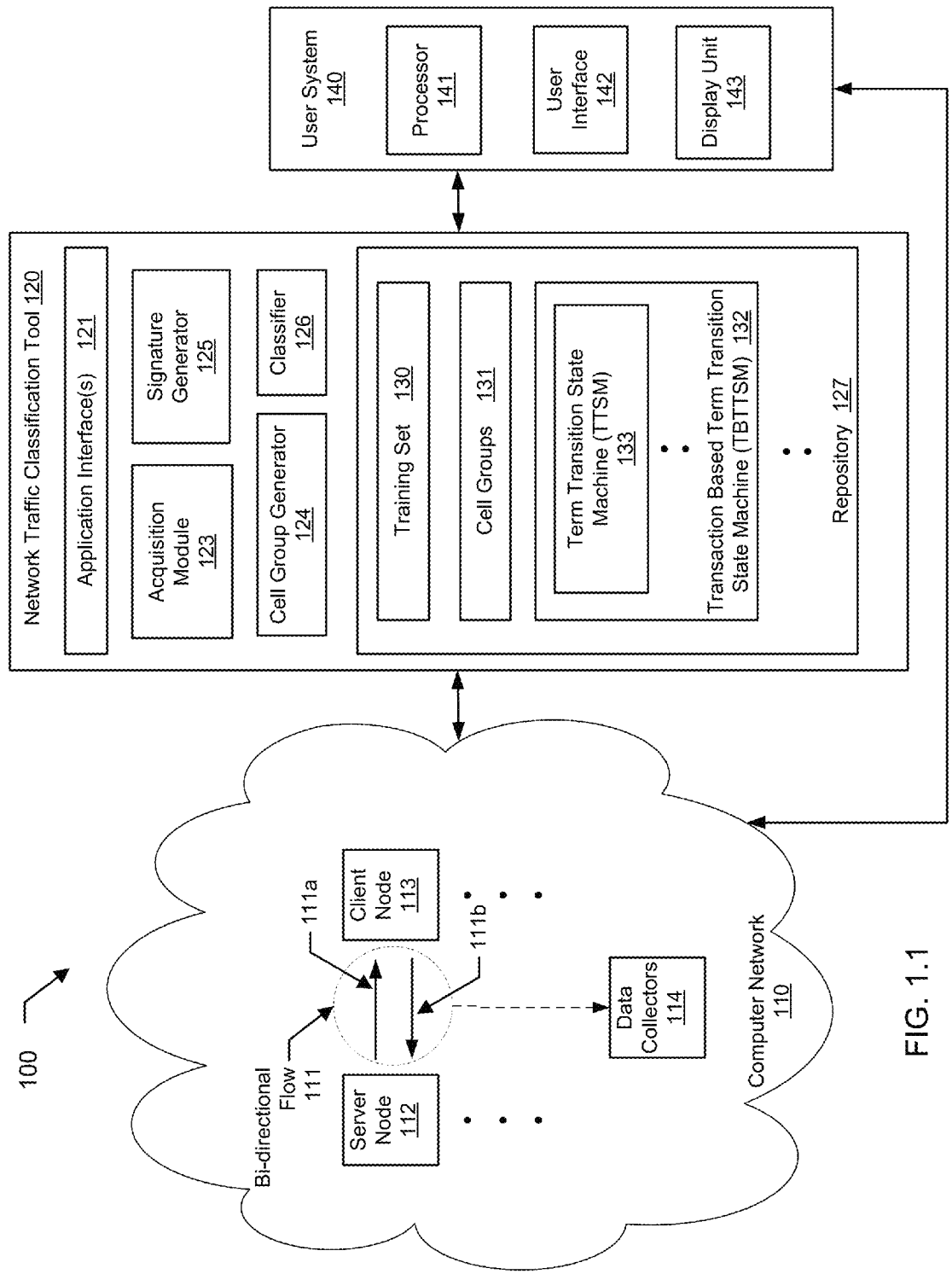
FIG. 1.1

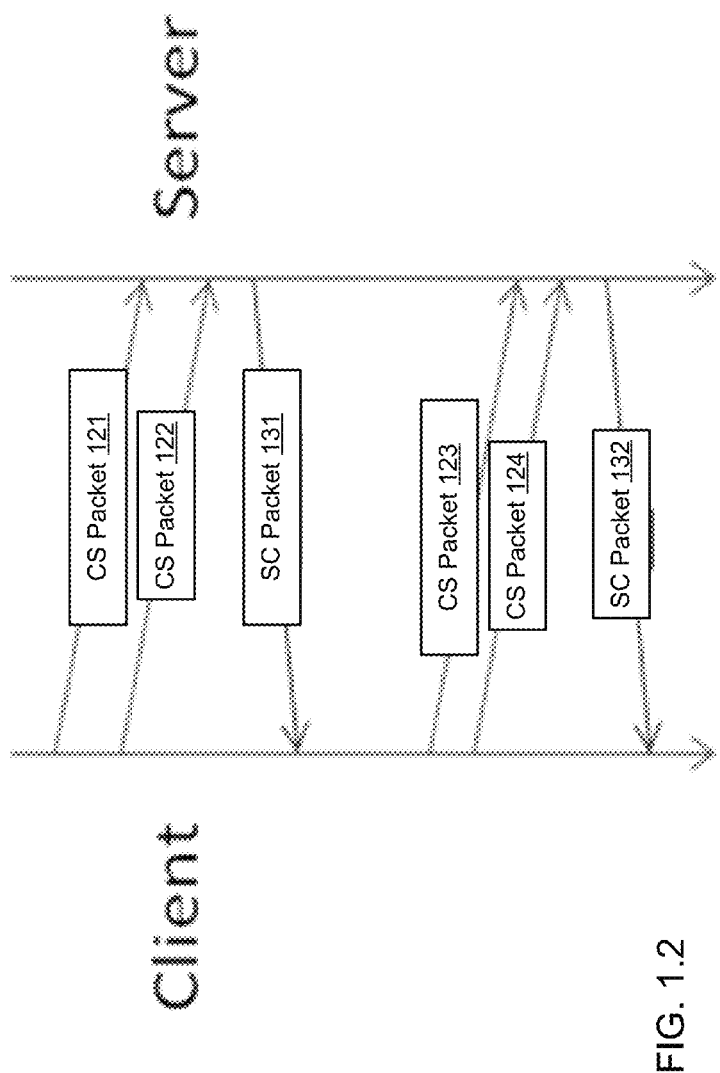
FIG. 1.2
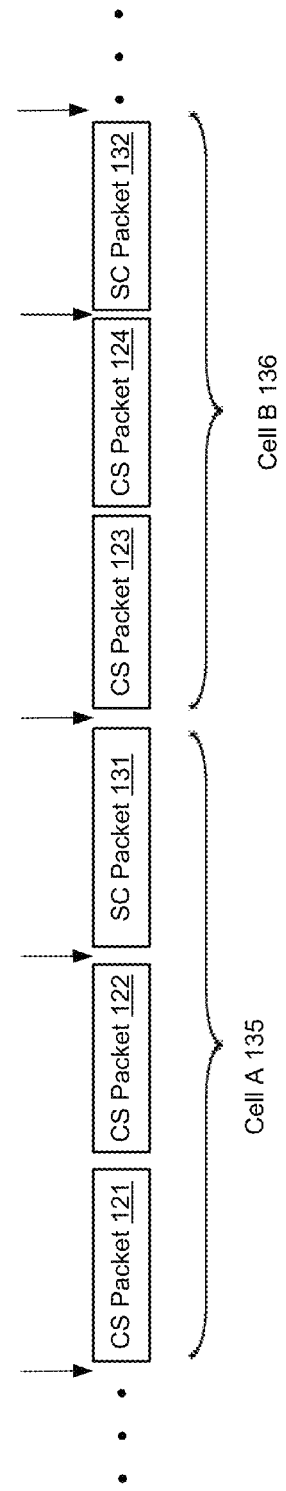
FIG. 1.3

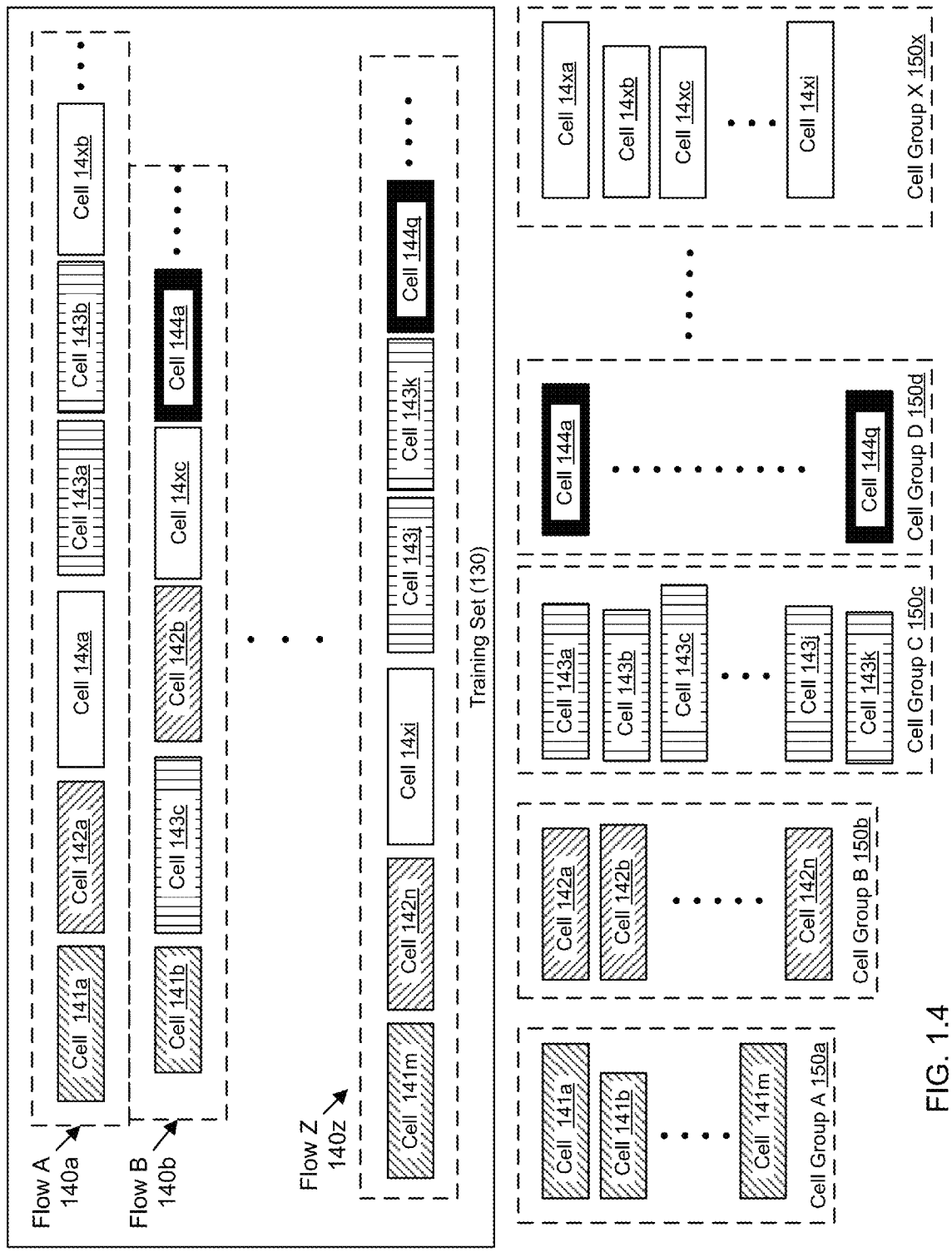
FIG. 1.4

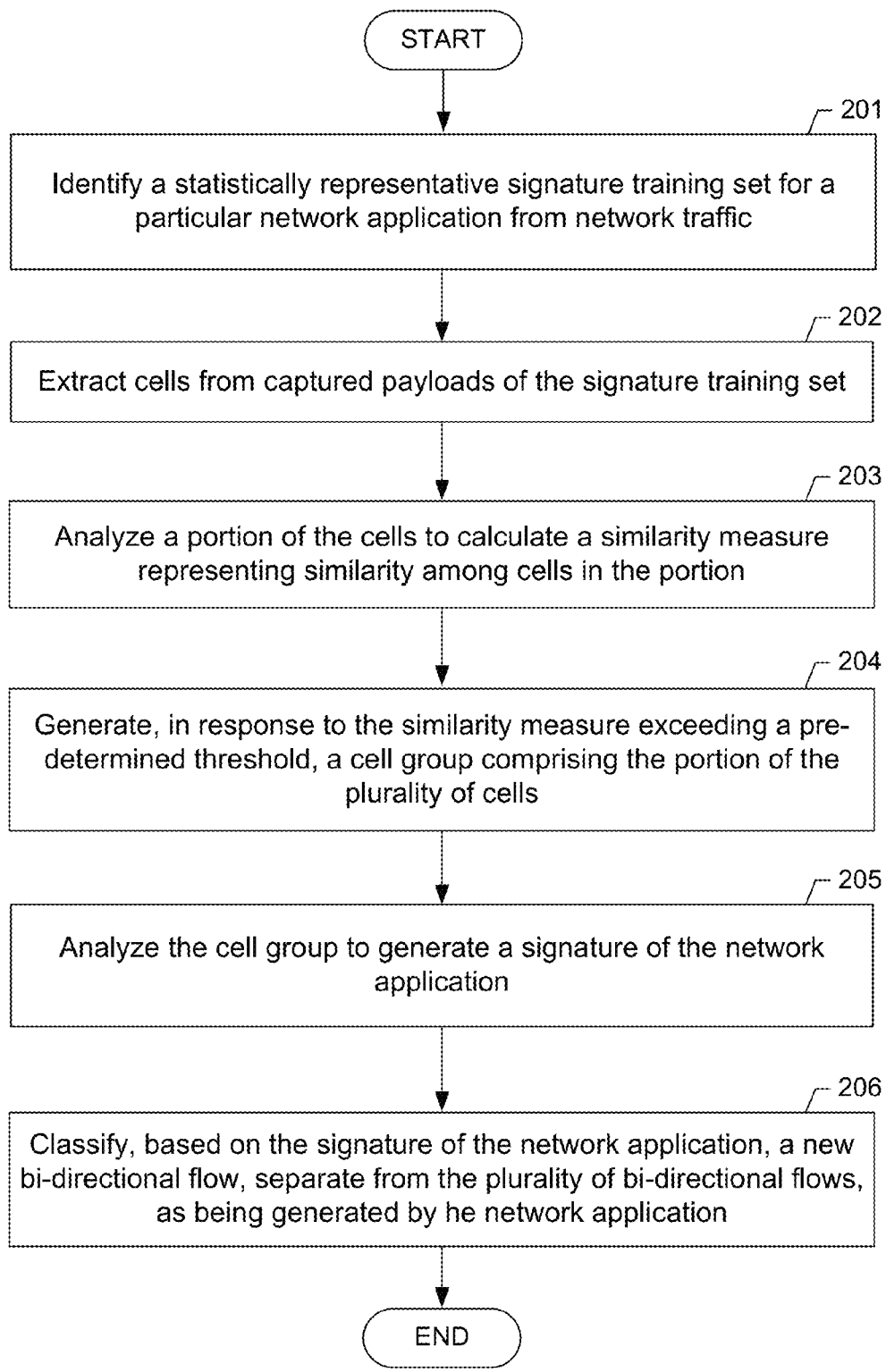
FIG. 2.1

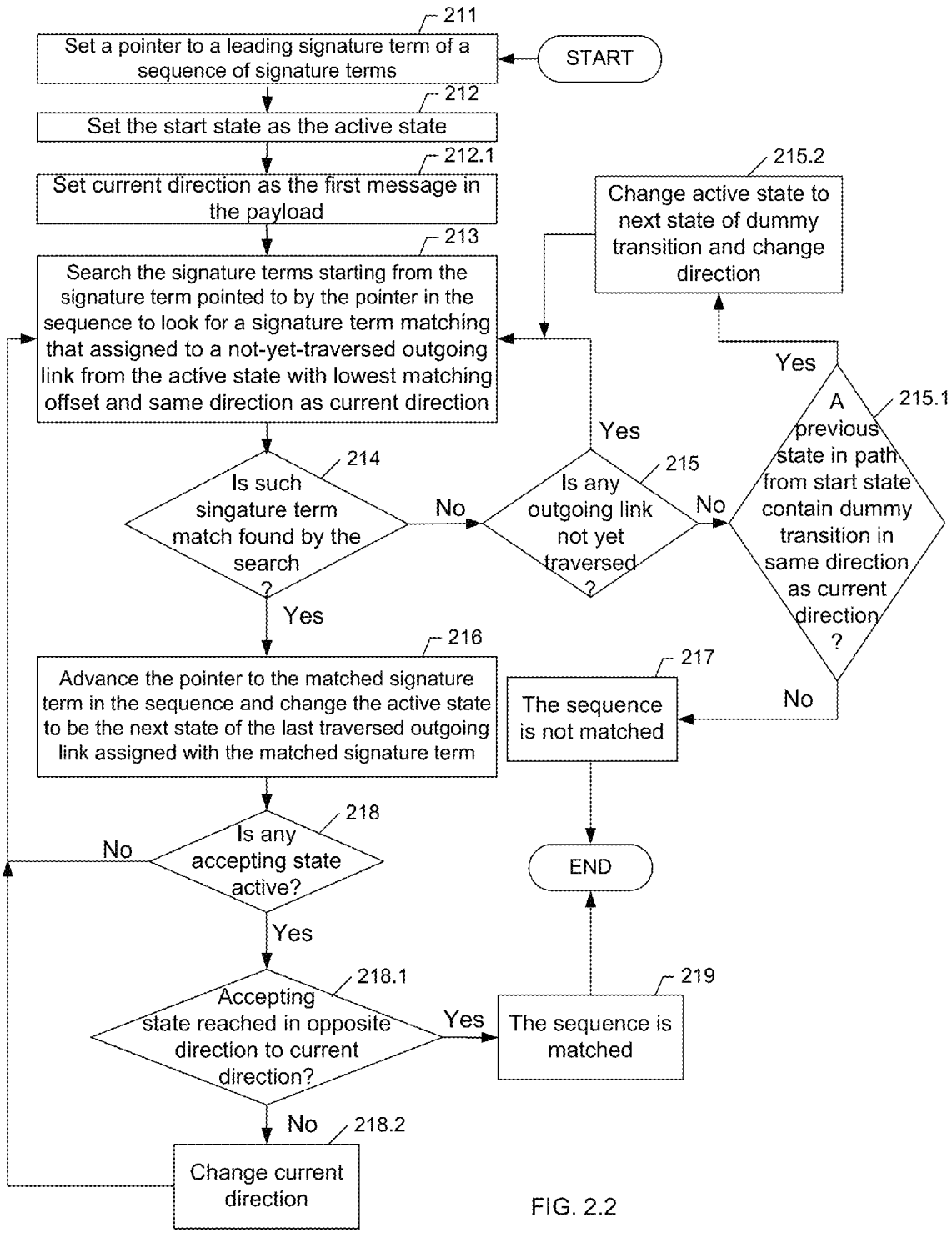
FIG. 2.2

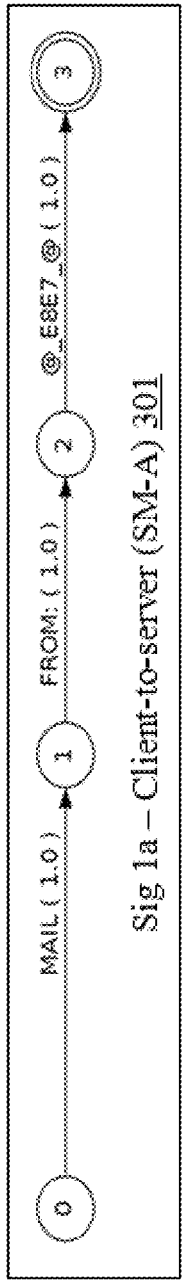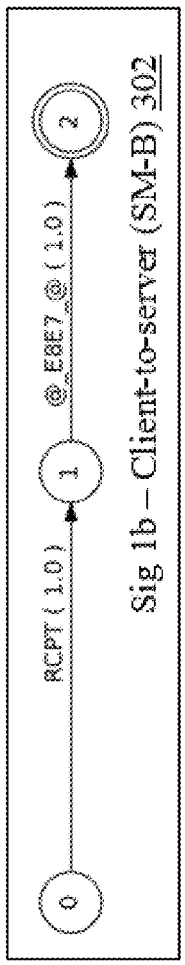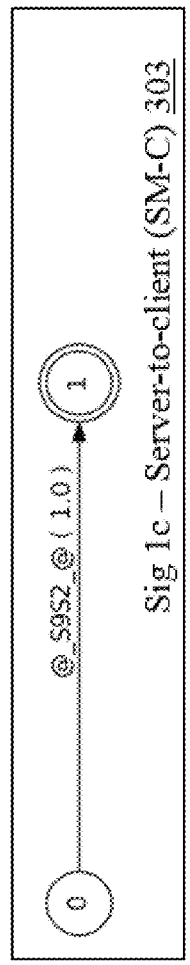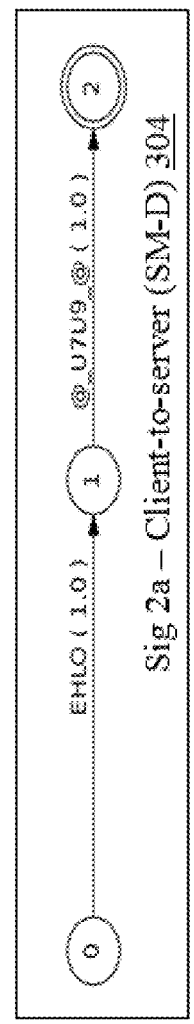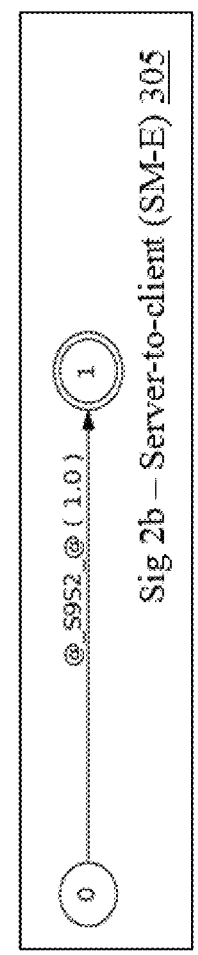
FIG. 3.1

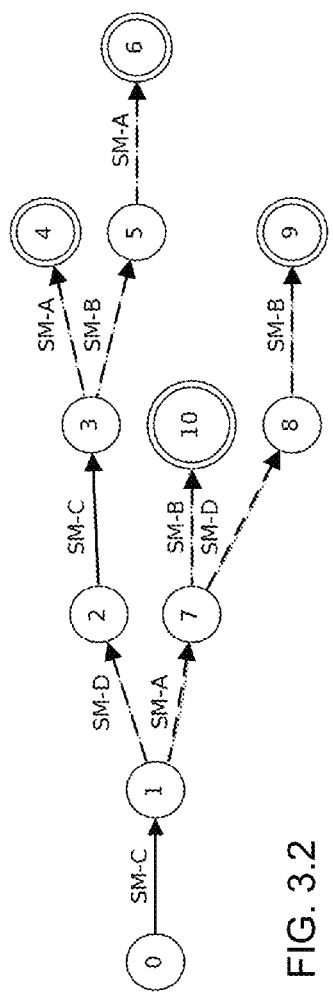
FIG. 3.2
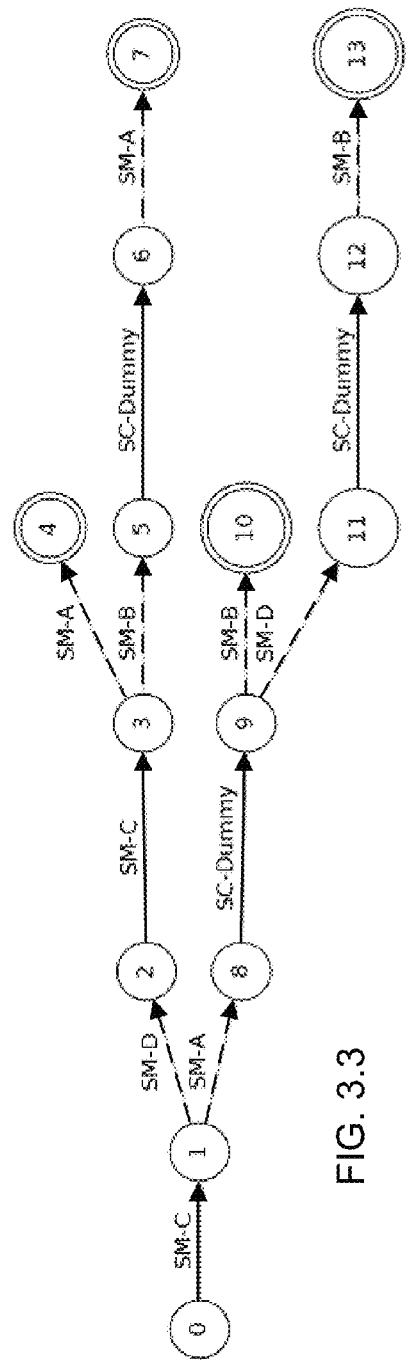
FIG. 3.3
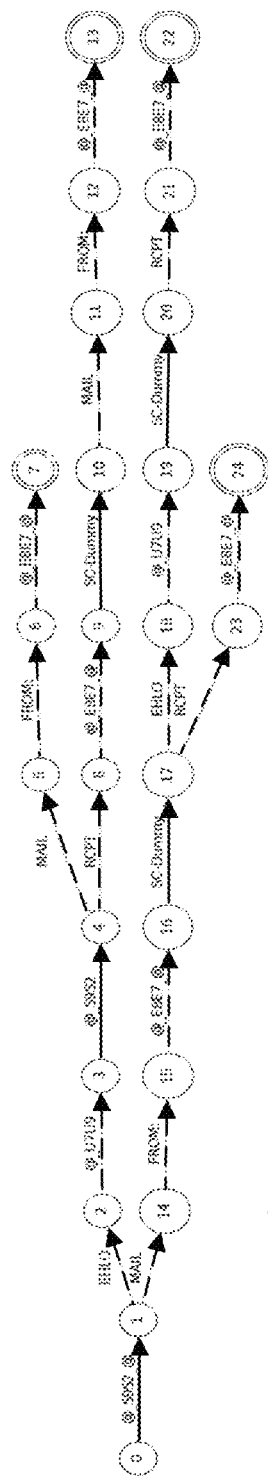
FIG. 3.4

TRANSACTION BASED NETWORK APPLICATION SIGNATURES FOR TEXT BASED PROTOCOLS

CROSS REFERENCE TO RELATED APPLICATIONS

This application is related to U.S. patent application Ser. No. 12/104,723 filed Apr. 17, 2008 and entitled "System and Method for Internet Endpoint Profiling," which is incorporated herein by reference.

This application is related to U.S. patent application Ser. No. 13/039,125 filed Mar. 2, 2011 and entitled "System and Method for Determining Network Application Signatures Using Flow Payloads," which is incorporated herein by reference.

This application is related to U.S. patent application Ser. No. 13/039,180 filed Mar. 2, 2011 and entitled "System and Method for Using Network Application Signatures Based On Term Transition State Machine," which is incorporated herein by reference.

This application is related to U.S. patent application Ser. No. 13/109,675 filed May 17, 2011 and entitled "System and Method for Using Network Application Signatures Based On Modified Term Transition State Machine," which is incorporated herein by reference.

BACKGROUND OF THE INVENTION

The evolution of the Internet in the last few years has been characterized by dramatic changes to the way users behave, interact and utilize the network. When coupled with the explosion of new applications sitting on the wire and the rising number of political, economic, and legal struggles over appropriate use of network bandwidth, it is easy to understand why now, more than ever, network operators are eager to posses a more precise and broader-in-scope information on which network applications are using their networks. The commercial world answered to this growing demand providing high-speed packet inspection appliances able to process up to 40 Gbps (gigabits per second) of traffic and supporting hundreds of packet content signatures. Still they appear to struggle in keeping up with the exponential rate at which new applications appear in the network. As a result, the attention of the research community has diverted to flow-based behavioral analysis techniques by applying sophisticated data mining algorithms that work on traffic flows (i.e., ignore packet content) to extract and analyze hidden properties of the traffic either in the forms of "social interaction" of hosts engaged in the communication or in the forms of "spatial-temporal analysis" of features such as flow duration, number and size of packets per flow, inter-packet arrival time. Apart from problems such as false positive and false negatives, these techniques are principally aimed at classifying a traffic flow with a broader application class (e.g., "P2P" (peer-to-peer) application class) rather than revealing the specific application (e.g., "P2P-KaZaA" of the many applications in the P2P application class) responsible for the traffic flow.

The demand for bandwidth management tools that optimize network performance and provide quality-of-service guarantees has increased substantially in recent years, in part, due to the phenomenal growth of bandwidth-hungry P2P applications. It is, therefore, not surprising that many network operators are interested in tools to manage traffic such that traffic critical to business or traffic with real-time constraints is given higher priority service on their network.

Furthermore, security is becoming a challenge. Networks and institutions of any size are constantly being targeted with more and more sophisticated attacks. Critical for the success of any such tool is its ability to accurately, and in real-time, identify and categorize each network flow by the application responsible for the flow. Identifying network traffic using port numbers and protocol (e.g., layer-four protocols, such as TCP, UDP, etc.) was the norm in the recent past. This approach was successful because many traditional applications (e.g., layer-seven applications, such as HTTP, SMTP, etc.) use port numbers (e.g., port 80, port 25, etc.) assigned by or registered with the Internet Assigned Numbers Authority (IANA). For example, this technique labels all traffic on TCP port 80 to be HTTP traffic, all traffic on TCP port 25 to be SMTP, and so on. This approach is extremely simple to implement and introduces very little overhead on the classifier. The accuracy of this approach, however, has been seriously reduced because of the evolution of applications that do not communicate on standardized ports. Many current generation P2P applications use ephemeral ports, and in some cases, use ports of well-known services such as Web and FTP to make them indistinguishable to the port-based classifier. For example, BitTorrent® (a registered trademark of BitTorrent, Inc., San Francisco, Calif.) can run on TCP port 80 if all the other ports are blocked. In addition, applications can use or abuse random ports for communication. For example, BitTorrent® can communicate on any TCP or UDP network port that is configured by the user. Furthermore, applications can tunnel traffic inside other applications to prevent detection and/or for ease of implementation. For example, BitTorrent® can send all its data inside a HTTP session. These strategies at the application-level have essentially made port number based traffic classification inaccurate and hence ineffective.

To overcome these issues with port-based approach, techniques that rely on application payload have been developed. Typically, a payload content based signature is developed for a given application by reverse engineering the application/protocol. These signatures are agnostic to the application port usage and are usually accurate (i.e., low false positive and false negative rates). However, this approach faces the problem of scalability. In other words, keeping up with the number of applications that come up everyday is impractical due to the laborious manual reverse engineering process. For example, several hundred new P2P and gaming protocols have been introduced over the last several years. Reverse engineering all these applications in a timely manner requires a huge manual effort. In addition, reverse engineering these applications becomes increasingly difficult when applications use encryption to avoid detection. As a consequence, keeping a comprehensive and up-to-date list of application signatures is infeasible.

SUMMARY

Generally, embodiments of the invention provide a system and method to develop accurate payload content based signatures without manual intervention for individual application (or application layer protocols) such that they can be used for real-time classification of flows. The architecture described herein decouples the real-time traffic classifier from the offline signature generation algorithms executed in an offline training phase. All the flows that are not labeled by the real-time classifier are grouped together as a flow set based on a pre-determined criterion (e.g., common port number or common DNS label shared by each flow of the flow set) and sent to the signature generation module, which uses offline signature generation algorithms during an offline training phase with no real-time performance constraint for extracting application signatures.

In one or more embodiments of the invention, the application signature is based on both the longest common substrings (referred to as signature terms) and the ordering of these signature terms in the flow payload. The ordered signature terms in multiple flows within a training set is represented as a state machine where the total number of states is minimized while ensuring that incoming flows can be identified in a real-time manner using the state machine.

In one or more embodiments of the invention, the application signatures are extracted from bi-directional flows in the training set during the offline training phase. In particular, the payloads from both directions of a flow are collected maintaining the relative ordering of the payloads. These ordered payloads correspond to transactions between client(s) and server(s) of the application, thus these application signatures are referred to as transaction based network application signatures. These transaction based network application signatures are then used to identify text based protocols of real time incoming flows. Throughout this disclosure, the terms "transaction," "data exchange," and "data communication exchange" may be used interchangeably depending on the context. Further, the terms "payload,' "captured payload," and "bi-directional payload" may be used interchangeably depending on the context.

In general, in one aspect, the present invention relates to a method for profiling network traffic of a network. The method includes (i) identifying, by a processor of a computer system and based on a pre-determined criterion, a training set from a plurality of bi-directional flows obtained from the network traffic, wherein the training set is associated with a network application, wherein each bi-directional flow comprises a sequence of captured payloads exchanged between a server and a client of the network, (ii) extracting, by the processor and based on a first pre-determined algorithm, a plurality of cells from the plurality of captured payloads, wherein each cell comprises a consecutive portion of the sequence of captured payloads, wherein the consecutive portion comprises at least one direction reversal in a corresponding bi-directional flow, (iii) analyzing, by the processor and based on a second pre-determined algorithm, a portion of the plurality of cells to calculate a similarity measure representing similarity among cells in the portion of the plurality of cells, (iv) generating, in response to the similarity measure exceeding a pre-determined threshold, a cell group comprising the portion of the plurality of cells, (v) analyzing, by the processor and based on a third pre-determined algorithm, the cell group to generate a signature of the network application, and (vi) classifying, by the processor and based on the signature of the network application, a new bi-directional flow, separate from the plurality of bi-directional flows, as being generated by the network application.

In general, in one aspect, the present invention relates to a system for profiling network traffic of a network. The system includes (i) a data collector configured to obtain, from the network traffic, a plurality of bi-directional flows, (ii) a cell group generator executing on a processor of a computer system and configured to (a) identify, from the plurality of bi-directional flows, a training set comprising a plurality of captured payloads corresponding to the plurality of bi-directional flows, (b) extract, based on a first pre-determined algorithm, a plurality of cells from the plurality of captured payloads, wherein each cell comprises a consecutive portion of the sequence of captured payloads, wherein the consecutive portion comprises at least one direction reversal in a corresponding bi-directional flow, (c) analyze, based on a second pre-determined algorithm, a portion of the plurality of cells to calculate a similarity measure representing similarity among cells in the portion of the plurality of cells, and (d) generate, in response to the similarity measure exceeding a pre-determined threshold, a cell group comprising the portion of the plurality of cells, (iii) a profiler executing on the processor and configured to identify the training set as associated with a network application, (iv) a signature generator executing on the processor and configured to analyze, based on a third pre-determined algorithm, the cell group to generate a signature of the network application, (v) a classifier executing on the processor and configured to classify, based on the signature of the network application, a new bi-directional flow, separate from the plurality of bi-directional flows, as being generated by the network application, and (vi) a repository configured to store the plurality of cells and the signature of the network application.

In general, in one aspect, the present invention relates to a computer readable medium storing instructions, when executed by the computer to profile network traffic of a network, the instructions include functionality for (i) identifying, based on a pre-determined criterion, a training set from a plurality of bi-directional flows obtained from the network traffic, wherein the training set is associated with a network application, wherein each bi-directional flow comprises a sequence of captured payloads exchanged between a server and a client of the network, (ii) extracting, based on a first pre-determined algorithm, a plurality of cells from the plurality of captured payloads, wherein each cell comprises a consecutive portion of the sequence of captured payloads, wherein the consecutive portion comprises at least one direction reversal in a corresponding bi-directional flow, (iii) analyzing, based on a second pre-determined algorithm, a portion of the plurality of cells to calculate a similarity measure representing similarity among cells in the portion of the plurality of cells, (iv) generating, in response to the similarity measure exceeding a pre-determined threshold, a cell group comprising the portion of the plurality of cells, (v) analyzing, based on a third pre-determined algorithm, the cell group to generate a signature of the network application, and (vi) classifying, based on the signature of the network application, a new bi-directional flow, separate from the plurality of bi-directional flows, as being generated by the network application.

Other aspects and advantages of the invention will be apparent from the following description and the appended claims.

BRIEF DESCRIPTION OF DRAWINGS

FIG. 1.1 shows a system block diagram according to aspects of the invention.

FIGS. 1.2-1.4 show example bi-directional flows according to aspects of the invention.

FIGS. 2.1 and 2.2 show a flowchart of a method according to aspects of the invention.

FIGS. 3.1-3.4 show various examples according to aspects of the invention.

DETAILED DESCRIPTION

Figure 4:
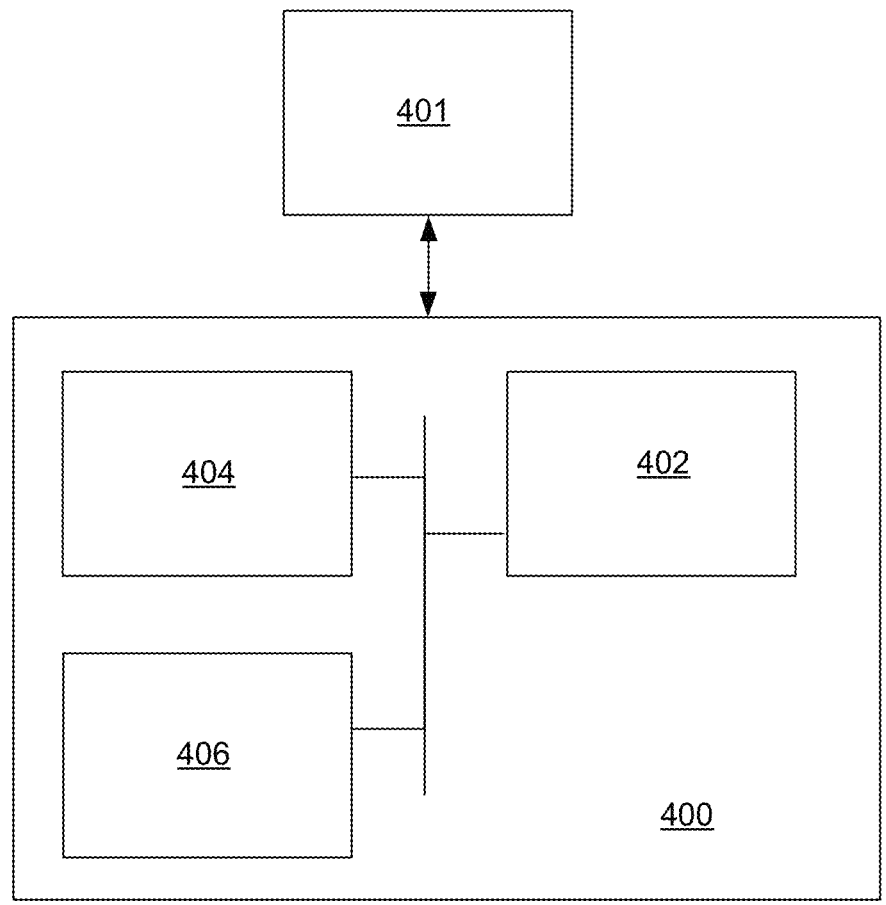
FIG. 4 shows a computer system according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

In one or more embodiments of the invention, when full payload packets of input flows are received, a real-time classifier first reconstructs flows and then makes an attempt to label these flows using any existing packet content based signatures. If the classifier successfully labels a flow, then the result is recorded in a database. The classification process for the flow ends. However, if the classifier cannot label the flow, then the flow is sent to a packet content signature generation process. Also, the classifier sends the server IP-address used in the flow to a server profiler. The main task of the server profiler is to find the application/protocol associated with the IP-address. Based on the flow(s) from the classifier and application/protocol name from the server profiler, a statistical analyzer first forms a cohesive flow set by grouping the flows received from the classifier that share same characteristics (e.g., common (port number, transport protocol) pair), and a cell group generator in conjunction with a signature generator subsequently extracts a set of signature terms to form a signature for the flow set. Specifically, the signatures for applications are generated to populate the signature library incrementally as flows generated by these applications are analyzed. Initially, there are no signatures in the signature library. When the first set of application flows are analyzed, a new signature for a particular application is generated and accordingly the signature library has one signature for the particular application. Henceforth all the flows that belong to the application (i.e., generated to execute the application) are classified and thus do not enter the offline training phase. Those flows that are not classified based on available signatures in the signature library are sent to the signature generator and used to generate another signature later on when sufficient number of flows are grouped into a cohesive flow set. Accordingly, false-negative errors of the real-time classifier may be reduced as time goes on.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network traffic classification tool (120), a user system (140), and a computer network (110). The network traffic classification tool (120) includes data repository (127), one or more application interfaces (121), acquisition module (123), cell group generator (124), signature generator (125), and classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the network (110).

As shown in FIG. 1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) is referred to as being generated by the application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113).

In one or more embodiments, certain device(s) (e.g., data collectors (114)) within the computer network (110) may be configured to collect network data (e.g., bi-directional flow (111)) for providing to the network traffic classification tool (120). Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., bi-directional flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.).

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic classification tool (120), the user system (140), and the communication links may be part of the computer network (110).

In one or more embodiments, a central processing unit (CPU, not shown) of the network traffic classification tool (120) is configured to execute instructions to operate the components of the network traffic classification tool (120). In one or more embodiments, the memory (not shown) of the network traffic classification tool (120) is configured to store software instructions for analyzing the network trace to extract features (e.g., cells, cell groups, signature terms, etc.), generating classification signatures, and classifying new flows captured from the network traffic to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic classification tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic classification tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), cell group generator (124), signature generator (125), and classifier (126). The data repository (127) may be a data store (e.g., a database, a file system, one or more data structures configured in a memory, some other medium for storing data, or any suitable combination thereof), which may include information (e.g., training set (130), signatures of application A (132), etc.) related to the network traffic classification. The data repository (127) may be a device internal to the network traffic classification tool (120). Alternatively, the data repository (127) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as training set (130), etc.

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments, the network traffic classification tool (120) includes the cell group generator (124) that is configured to (i) identify a training set (130) from bi-directional flows (e.g., bi-directional flow (111)) in the network trace, (ii) extract cells from bi-directional payloads in the training set (130), and (iii) generate cell groups (131) from the extracted cells. Specifically, each bi-directional flow corresponds to a series of data communication exchanges between a server and a client of a network application, each cell corresponds to a particular server/client exchange (referred to as a message) in the series of data communication exchanges, and each cell group corresponds to a particular type of server/client exchange (i.e., message) frequently occurring in data communication exchanges among servers and clients of the network application.

FIG. 1.2 shows an example of a series of data communication exchanges between a server (e.g., server node (112) shown in FIG. 1.1) and a client (e.g., client node (113) shown in FIG. 1.1) of a network application. As shown, the vertical downward pointing arrows represent progression of time, along which data packets are exchanged between the client and the server. In particular, data packets sent from the client to the server (C-S) are labeled "CS packet" while data packets sent from the server to the client (S-C) are labeled "SC packet". Accordingly, the series of data communication exchanges between the server and the client includes CS packet (121), CS packet (122), SC packet (131), CS packet (123), CS packet (124), SC packet (132), etc. In one or more embodiments, each of these packets is a layer-seven (i.e., application layer) packet generated by the network application, which is a layer-seven application. In one or more embodiments, the uni-directional packets in-between direction changes form a uni-directional message. For example, CS packet (121) and CS packet (122) form a CS message, SC packet (131) forms a SC message. Each of the data communication exchanges typically includes a CS message and a SC message.

FIG. 1.3 shows an example of a sequence of ordered payloads in a bi-directional flow (e.g., bi-directional flow (111) shown in FIG. 1.1) corresponding to the series of data communication exchanges between the server and the client shown in FIG. 1.2 above. In one or more embodiments, the sequence of ordered payloads includes layer-seven payloads (e.g., represented as CS packet (121), CS packet (122), SC packet (131), CS packet (123), CS packet (124), SC packet (132), etc.). In addition, the sequence of ordered payloads includes delimiters for end of packets and markers marking direction reversal every time the direction of the flow changes from client-to-server to server-to-client, and vice versa. For example, these direction reversal markers are represented as downward pointing arrows in FIG. 1.3. Accordingly, the sequence of ordered payloads are divided into cells (e.g., cell A (135), cell B (136)) where each cell corresponds to a particular server/client exchange in the series of data communication exchanges. As noted above, each server/client exchange typically includes a CS message and a SC message.

Returning to the discussion of FIG. 1.1, in one or more embodiments, the training set (130) includes layer-seven payloads corresponding to the bi-directional flows (e.g., bi-directional flow (111)) captured by the acquisition module (123) and the data collectors (114). In one or more embodiments, network application signatures of the layer-seven application are extracted/generated from the training set (130) to form a Transaction Based Term Transition State Machine (TBTTSM), such as the TBTTSM (132). Specifically, the network application signatures are extracted/generated by the signature generator (125) in conjunction with the cell group generator (124).

In one or more embodiments, the cell group generator (124) includes functionality of the statistical analyzer (104) described in the related U.S. patent application Ser. No. 13/039,125 (hereinafter referred to as the "related '125 application") filed Mar. 2, 2011 and entitled "System and Method for Determining Network Application Signatures Using Flow Payloads," which is incorporated herein by reference. In particular, the cell group generator (124) includes functionality of the statistical analyzer (104) of the related '125 application to identify the training set (130) from the network trace by (i) determining that the server port number and the transport protocol is same for each bi-directional flow in the training set (130), (ii) determining a number of servers attached to these bi-directional flows in the training set (130) as exceeding a pre-determined server diversity threshold, (iii) determining a number of bi-directional flows in the training set (130) as exceeding a pre-determined training set size threshold, and (iv) determining a statistical deviation in contributions of each server to the training set (130) as being less than a pre-determined server contribution deviation threshold. In one or more embodiments, the network traffic classification tool (120) includes functionality of the server profiler (105) of the related '125 application to identify the training set (130) as associated with a particular a layer-seven network application.

In one or more embodiments, the cell group generator (124) is further configured to extract, based on a pre-determined cell extraction algorithm, a number of cells (e.g., cell A (135), cell B (136) shown in FIG. 1.3) from the captured payloads in the training set (130). Consistent with FIG. 1.3 above, the pre-determined cell extraction algorithm extract a consecutive portion of the sequence of captured payloads as a cell. In one or more embodiments, the consecutive portion of the sequence of captured payloads extracted into a cell includes a pair of successive client-to-server and server-to-client payloads (either of which may be empty payload with only direction reversal markers without any other payload data). In one or more embodiments, the consecutive portion of the sequence of captured payloads extracted into a cell includes at least one direction reversal in a corresponding bi-directional flow. For example, each of cell A (135) and cell B (136) shown in FIG. 1.3 includes one direction reversal marker internal to the respective cell in addition to the direction reversal markers at the cell boundaries. In one or more embodiments, a cell includes the leading direction reversal marker but not the trailing direction reversal marker. Accordingly, the cell includes at least two direction reversal markers, one at the leading cell boundary and another one internal to the cell. In one or more embodiments, a cell includes the trailing direction reversal marker but not the leading direction reversal marker. Accordingly, the cell includes at least two direction reversal markers, one at the trailing cell boundary and another one internal to the cell. In one or more embodiments, a cell includes both the leading direction reversal marker and the trailing direction reversal marker. In other words, the direction reversal marker at each cell boundary is included in two cells adjacent to each other. In such embodiments, the cell includes at least three direction reversal markers, two at the leading and trailing cell boundaries and another one internal to the cell.

Although each of the cell A (135) and cell B (136) is shown in FIG. 1.3 to include a single pair of successive client-to-server and server-to-client payloads, in one or more embodiments, the pre-determined cell extraction algorithm used by the cell group generator (124) may extract multiple pairs of successive client-to-server and server-to-client payloads into a single cell. In such embodiments, a single cell may include two or more internal direction reversal markers.

In one or more embodiments, the cell group generator (124) is further configured to (i) analyze a portion of the cells extracted from the captured payloads in the training set (130) to calculate a similarity measure representing similarity among cells in the portion of the cells, and (ii) generate, in response to the similarity measure exceeding a pre-determined threshold, a cell group including the portion of the cells. In one or more embodiments, these two tasks are performed using a pre-determined cell grouping algorithm. In one or more embodiments, the cell group generator (124) generates multiple cell groups from the training set (130) that are stored in the repository (127) as the cell groups (131).

In one or more embodiments, the captured payloads in the training set (130) are layer-seven payloads generated by a network application using a text protocol. In other words, the captured payloads include text strings, such as alphanumeric character strings. In such embodiments, two cells are said to be similar if server-to-client portions of the two cells share a common substring (i.e., common term) and client-to-server portions of the two cells also share another common substring. Further, a similarity measure is determined between two similar cells based on frequency of occurrence of the shared common substrings in the training set. Further still, a similarity measure representing similarity among a set of cells (e.g., the aforementioned portion of the cells analyzed to form a cell group) is determined by combining (e.g., summing) the similarity measures between all similar cell pairs in the set of cells. For example, the sum of the similarity measures between all similar cell pairs in a cell group has to exceed the aforementioned pre-determined threshold of the pre-determined cell grouping algorithm.

An example of the pre-determined cell grouping algorithm used by the cell group generator (124) is shown in TABLE 1 below. As shown in TABLE 1, the cell group generator (124) first extracts common substrings by comparing two flows at a time and extracting the common substrings between them. Then the common substrings (i.e., common term) for which the frequency of occurrence (or normalized frequency of occurrence, also referred to as probability of occurrence) in the training set (130) is above certain threshold, are collected to form an extracted term set. For example, for an example of the training set (130) based on TCP port 25, the extracted term set includes {EHLO, HELO, MAIL, FROM:, RCPT, @_E8E7_@, @_S9S2_@, @_U7U9_@, QUIT, SIZE}. Here, @_E8E7_@ is a token that stands for any email address, @_S9S2_@ is a token that stands for any status code, and @_U7U9_@ is a token that stands for any URL. In one or more embodiments, the extracted term set is stored in the repository (127) as a part of the training set (130).

In the cell grouping algorithm shown in TABLE 1, the training set (130) is referred to as a flow set, from which a working set of cell groups "workingCellGroupSet" is maintained (line 3 of TABLE 1). The extracted term set in the flow set is used to determine the similarity function "cellGroup.termSimilarity(cell)", which represents similarity of a cell and a cell group "cellGroup" in the "workingCellGroupSet". Similar cells are grouped together by adding the cell to the cellGroup if the similarity function "cellGroup.termSimilarity(cell)" returns a TRUE value (line 13 of TABLE 1). The value returned by the similarity function "cellGroup.termSimilarity(cell)" is determined by (i) comparing the client-to-server payload of the cell with client-to-server payloads of existing cell(s) in the cellGroup, and (ii) comparing the server-to-client payload of the cell with server-to-client payloads of existing cell(s) in the cellGroup. If both the server-to-client payloads and the client-to-server payloads are similar, the cell is added into the existing cellGroup (line 14 of TABLE 1). For the example training set based on TCP port 25 (typically used for the layer-seven application "SMTP"), consider comparing a new cell "cell 1" with an existing cell "cell 2" in the cellGroup. Cell 1 includes the following:

Client-to-server: MAIL FROM: <DAGA@LABSERVICE.IT> BODY=8BITMIME SIZE=65650

Server-to-client: 250 2.1.0<DAGA@LABSERVICE.IT>SENDER OK.

Cell 2 includes the following:

Client-to-server: MAIL FROM: BALLOTPUCKISH@JUNK.COM

Server-to-client: 550 MAIL NOT ACCEPTED FROM BLACKLISTED IP ADDRESS [93.58.110.237].

Here the client-to-server payloads have common terms "MAIL" and "FROM:" from the extracted term set. Moreover the server-to-client payloads have 250 and 550 as status codes which are converted to status code token @_S9S2_@ as a common term. Hence these 2 cells can be grouped together and cell 1 is added into cellGroup.

Now considering cell 3 that includes the following:

Client-to-server: EHLO GHV6J25.8QWP0ZYYRMC.NET

Server-to-client: 250 MX2.UST.HK SENDER OK.

No common terms exist between cell 3 and either of cell 1 or cell 2. Hence, cell 3 will be in a new cell group.

Cell 1 now belongs to the cellGroup and cell.hasGroup is set to TRUE (line 15 of TABLE 1). For cells which do not belong to any cell group (line 19) but contain a term from the extracted term set of the flow set, a new cell group is add to the working set (lines 21-23 of TABLE 1). For the rest of the cells that do not contain any term from the extracted term set of the flow set, they are placed in a special cell group "rejected" (line 25 of TABLE 1).

Further as shown in TABLE 1, all cells in the "rejected" cell group are analyzed to group together cells that are similar based on their contents (i.e., substrings) (lines 30-43 of TABLE 1). For example, considering two cells containing client-to-server payloads:

Client-to-server 1: STARTTLS
Client-to-server 2: STARTTLS

Although no term in these payloads belongs to the extracted term set, these two client-to-server payloads are similar (actually same in this case) based on the similarity function "cellGroup.contentSimilarity(cell)" (e.g., based on the edit distance measures) (line 32 of TABLE 1). So even though these cells do not belong to any other cell groups based on the similarity function "cellGroup.termSimilarity(cell)", they are grouped together based on the similarity function "cellGroup.contentSimilarity(cell)". To determine if two cells are similar based on the similarity function "cellGroup.contentSimilarity(cell)", the edit distance between the client payloads of the two cells and the edit distance between server payloads of the two cells are determined. If the edit distances are below certain threshold then the cells are considered to be similar. As a parallel to the "workingCellGroupSet", a rejected set of cell groups "rejectedCellGroupSet" is maintained (line 31 of TABLE 1). Finally, all newly formed cell groups in "rejectedCellGroupSet" are added to working set of cell groups (line 44 of TABLE 1).

Although a two step process with separate similarity measures are used in the example cell grouping algorithm shown in TABLE 1, other examples of the pre-determined cell grouping algorithm used by the cell group generator (124) may use a single similarity measure (e.g., a term based similarity measure such as cellGroup.termSimilarity(cell) or a content based similarity measure such as cellGroup.contentSimilarity(cell)).

In one or more embodiments, the cell group generator (124) is further configured to divide a cell group to generate a uni-directional cell group including captured payloads sent from servers of the network application and another uni-directional cell group including captured payloads sent from clients of the network application.

TABLE 1

1. Set<Strings> allPayloads = getAllPayloads(flowset);
2. Set<Cell> cells = breakupIntoCells(allPayloads);
3. Set<CellGroup> workingCellGroupSet = Φ;
4. CellGroup rejected = createNewCellGroup( );
5. Set<CellGroup> rejectedCellGroupSet = Φ;
6. FOR cell IN cells DO
7.   IF sizeOf(cellGroups) == 0 THEN
8.     cellGroup = createNewCellGroup( );
9.     cellGroup.add(cell);
10.    workingCellGroupSet.add(cellGroup);
11.  ELSE
12.    FOR cellGroup IN workingCellGroupSet DO
13.      IF cellGroup.termSimilarity(cell) == TRUE THEN
14.        cellGroup.add(cell);
15.        cell.hasGroup = TRUE;
16.        BREAK;
17.      ENDIF
18.    ENDFOR
19.    IF cell.hasGroup == FALSE THEN
20.      IF cell.hasTerms == TRUE THEN
21.        cellGroup = createNewCellGroup( );
22.        cellGroup.add(cell);
23.        workingCellGroupSet.add(cellGroup);
24.      ELSE
25.        rejected.add(cell);
26.      ENDIF
27.    ENDIF
28.  ENDIF
29. ENDFOR
30. FOR cell IN rejected DO
31.   FOR cellGroup IN rejectedCellGroupSet DO
32.     IF cellGroup.contentSimilarity(cell) == TRUE THEN
33.       cellGroup.add(cell);
34.       cell.hasGroup = TRUE;
35.       BREAK;
36.     ENDIF
37.   ENDFOR
38.   IF cell.hasGroup == FALSE THEN
39.     cellGroup = createNewCellGroup( );
40.     cellGroup.add(cell);
41.     rejectedCellGroupSet .add(cellGroup);
42.   ENDIF
43. ENDFOR
44. workingCellGroupSet.addAll(rejectedCellGroupSet);

FIG. 1.4 shows examples of the cell groups (131) generated from the training set (130). Cells which are similar (either based on term similarity or content similarity) are highlighted with the same pattern. For example, flow A (140a), flow B (140b), flow Z (140z), etc. includes various highlighted cells, such as cell (141a) through cell (14xi). Accordingly, cell (141a) through cell (141m) are grouped into the cell group A (150a), cell (142a) through cell (142n) are grouped into the cell group B (150b), cell (143a) through cell (143k) are grouped into the cell group C (150c), cell (144a) through cell (144q) are grouped into the cell group D (150d), etc. These cell groups are based on term similarity. Lastly, cell (14xa) through cell (14xi) are grouped into the cell group X (150x) based on content similarity.

Returning to the discussion of FIG. 1.1, in one or more embodiments, the network traffic classification tool (120) includes the signature generator (125) that is configured to analyze, based on a pre-determined signature generation algorithm, the cell groups (131) to generate a signature of the network application. In one or more embodiments, the signature of the network application is a Transaction Based Term Transition State Machine (TBTTSM), such as the TBTTSM (132).

In one or more embodiments, the signature generator (125) includes functionality of the signature generator (106) of the related '125 application to extract signature terms for generating a Term Transition State Machine (TTSM). Specifically, the signature generator (125) is configured to use this functionality to analyze each cell group (e.g., cell group A (150a), cell group B (150b), cell group C (150c), cell group D (150d), cell group X (150x), etc.) in the cell groups (131) to generate a TTSM. For example, the TTSM (133) may be generated from the cell group A (150a).

In one or more embodiments, the signature generator (125) is further configured to combine multiple TTSMs (e.g., TTSM (133)) generated from the cell groups (131) into a TBTTSM (e.g., TBTTSM (132)). In one or more embodiments, multiple TTSMs are first combined into an overlay state machine, which is then converted into the TBTTSM by expanding signature terms in the TTSMs. Details of generating the TTSMs from the cell groups (131) and combining the TTSMs into a TBTTSM are described in reference to the method flow chart depicted in FIG. 2 and the example depicted in FIGS. 3.1-3.4 below.

FIGS. 2.1 and 2.2 depict a flowchart of a method in accordance with one or more embodiments of the invention. In one or more embodiments of the invention, one or more of the steps shown in FIGS. 2.1 and 2.2 may be omitted, repeated, and/or performed in a different order. Accordingly, embodiments of the invention should not be considered limited to the specific arrangements of steps shown in FIGS. 2.1 and 2.2. In one or more embodiments of the invention, the method depicted in FIGS. 2.1 and 2.2 may be practiced using system (100) described with respect to FIG. 1 above.

FIG. 2.1 shows the main loop of the method flowchart in accordance with one or more embodiments of the invention. Initially in Step 201, a training set is identified from bi-directional flows obtained from the network traffic. In particular, the training set is associated with a network application, where each bi-directional flow includes a sequence of captured payloads exchanged between a server and a client of the network. In one or more embodiments, the network application is a layer-seven application. In one or more embodiments, the training set is identified using Steps 201-202 of the method flow chart described in FIG. 2a of the related '125 application. In one or more embodiments, the signature of the network application is included in a signature set of the network application. Any bi-directional flow obtained from the network traffic that fails to be classified based on the signature set of the network application are included in a flow set, from which the training set is identified.

In Step 202, using a pre-determined cell extraction algorithm, a number of cells are extracted from the sequence of captured payloads, where each cell includes a consecutive portion of the sequence of captured payloads. In one or more embodiments, the consecutive portion includes at least one direction reversal in a corresponding bi-directional flow. Examples of extracted cells are described in reference to FIG. 1.3 above.

In Step 203, using a pre-determined cell grouping algorithm, a portion of the cells are analyzed to calculate a similarity measure representing similarity among cells in the portion of the cells. An example cell grouping algorithm is described in reference to TABLE 1 above.

In Step 204, using the pre-determined cell grouping algorithm and in response to the similarity measure exceeding a pre-determined threshold, a cell group is generated that includes the portion of the cells analyzed in Step 203. Examples of cell groups are described in reference to FIG. 1.4 above.

In Step 205, using a pre-determined signature generation algorithm, one or more cell groups are analyzed to generate a signature of the network application. In one or more embodiments, the signature of the network application is a Transaction Based Term Transition State Machine (TBTTSM).

In one or more embodiments, the cell group is divided to generate a server-to-client uni-directional cell group including captured payloads sent from servers of the network and a client-to-server uni-directional cell group including captured payloads sent from clients of the network. In one or more embodiments, separate basic signatures of the network application are generated from the server-to-client uni-directional cell group and the client-to-server uni-directional cell group. For example, each of these basic signatures may be a TTSM described in the related '125 application. In one or more embodiments, multiple TTSMs generated from multiple cell groups are combined into an overlay state machine. TTSM signature terms may then be expanded in the overlay state machine to form a TBTTSM. Examples of the TTSM, overlay state machine, and the TBTTSM are described in reference to FIGS. 3.1-3.4 below.

In Step 206, a new bi-directional flow, separate from the training set, is classified based on the signature of the network application as being generated by the network application. Details of Step 206 are shown in FIG. 2.2 based on the classification flow chart shown in FIG. 2b of the related '125 application. In particular, Step 213 is revised from and Steps 212.1, 215.1, 215.2, 218.1, and 218.2 are inserted into the classification flow chart of the related '125 application. These revised and newly inserted steps are described below to illustrate the difference between the bi-directional flow classification of Step 206 and the uni-directional flow classification of the related '125 application.

In one or more embodiments, a Non-deterministic Finite Automata (NFA), referred to as a Transition Based Classifier (TBC) is used for classifying the new bi-directional flow based on the TBTTSM. TBC traverses the TBTTSM from the start state of TBTTSM to match the new bi-directional flow. Specifically, TBC maintains a current pointer in the new bi-directional flow to be classified, which is set to the first byte. At each state, TBTTSM iterates over all out-going transitions and searches the payload of the new bi-directional flow for the terms in those transitions. TBC also finds out the offset where the terms are matched in the payload.

TBC then selects the transition whose offset is minimum and moves to the next state of the selected transition. If the TBC reaches an accepting state, it announces a match. If the pointer in the payload points to a location beyond the payload, then TBC announces a failure to match. If the TBC reaches a non-accepting state from which it can not make progress, i.e., current pointer can not be incremented as well as no out going transitions match, then TBC "backtracks", i.e., goes back to an earlier state in the matching path (i.e., traversed path of the TBTTSM) that contains a dummy transition. TBC takes this dummy transition and skips into the opposite direction in the payload.

In one or more embodiments described in the related '125 application, the uni-directional flow classifier may be a Deterministic Finite Automata (DFA), i.e., the classifier disclosed in those embodiments of the related '125 application has no backtracking. In other words, a state of the automata is visited only once during matching using the uni-directional flow classifier disclosed in those embodiments of the related '125 application. In contrast, the same state may be visited multiple times during matching using TBC. Another way of putting it is, in those embodiments of the related '125 application, only one transition will be selected from any state for a payload, while for TBC different transitions may be selected from a given state at different points of matching a single payload.

FIGS. 3.1-3.4 show an example for generating TTSMs (e.g., TTSM (133)) for the cell groups (131) and combining the TTSMs into the TBTTSM (132). In particular, the example is based on the schematic diagrams, the example cell group generation algorithm, and the method flow chart shown in FIG. 1.1 through FIG. 2 and TABLE 1 above.

Following the method flow chart shown in FIG. 2 above, all payloads in the same direction in a cell group (e.g., cell group A (150*a*), cell group B (150*b*), cell group C (150*c*), cell group D (150*d*), cell group X (150*x*), etc.) in the cell groups (131) are included in a uni-directional cell group. Signatures are generated as described in the related '125 application by using each uni-directional cell group as a cohesive flow-set described in the related '125 application. These generated signatures are referred to as Term Transition State Machines (TTSMs) in the related '125 application. Since all signatures from different cell groups are formed independently of each other, there are may be overlaps between the TTSMs. To identify and eliminate these overlaps, each path of every TTSMs is splitted into a state machine of its own. The single path state machines can be compared easily for overlaps and merged together when no more overlap is found.

FIG. 3.1 shows examples of single path TTSMs extracted/generated from the example training set based on TCP port 25. Specifically, Sig 1a—Client-to-server (SM-A) (301) and Sig 1b—Client-to-server (SM-B) (302) are single path TTSMs extracted for client-to-server direction from an example cell group 1. The example cell group 1 includes the cell 1 and cell 2 described in reference to TABLE 1 above. Sig 1c—Server-to-client (SM-C) (303) is the server-to-client state machine for cell group 1. Similarly, Sig 2a—Client-to-server (SM-D) (304) and Sig 2b—Server-to-client (SM-E) (305) are the single path TTSMS extracted for the client-to-server direction and server-to-client direction from and example cell group 2. The example cell group 2 includes the cell 3 described in reference to TABLE 1 above. Double circles indicate accepting states. Numbers enclosed in the parentheses next to labels indicate transition probabilities.

Using these single path TTSMs, the original payloads in the cell groups of the example training set based on TCP port 25 are traversed. For each payload, an ordered list of TTSMs can be determined that match the payload. In addition, these ordered lists are combined to form a prefix tree, referred to as an overlay state machine. FIG. 3.2 shows the overlay state machine for TCP port 25 using the single path TTSMs shown in FIGS. 3.1.

To ensure that signatures exist in alternating directions, a Client Dummy State Machine (CS-Dummy) is inserted in between consecutive Server-to-Client TTSMs, and a Server Dummy State Machine (SC-Dummy) is inserted in between consecutive Client-to-Server TTSMs. FIG. 3.3 shows SC-Dummies inserted into the overlay state machine shown in FIG. 3.2.

The terms in the TTSMs are expanded in the overlay state machine to obtain a TBTTSM. FIG. 3.4 shows the TBTTSM for TCP port 25. Dashed arrows indicate client-to-server transitions while solid arrows indicate server-to-client transitions. The following optimizations may be performed to reduce the size of the TBTTSB:

i) Common prefix merging—if two paths share a common prefix, the common prefix is merged ii) Repeating pattern elimination—if a path contains repeating pattern, then only the first instance of the pattern is kept with other repeating patterns discarded iii) Trivial path elimination—if the transition probability of a path is below a threshold, the path is discarded iv) Suffix based optimization—if two paths share a common suffix, the common suffix is merged The resulting state machine is referred to as an Optimized Transaction Based Term Transition State Machine (OT-BTTSM).

Transaction Based Classifier (TBC) (i.e., classifier (126) shown in FIG. 1.1) uses a two step classification process for efficiency reasons, namely (i) Matching terms identification and (ii) Matching state machines identification. Details of the two steps are described in detail below based on an example string matching algorithm—Aho-Corasick string matching algorithm. In TBC, different parts of the payload are sent to different ACTries based on the direction. For example, for a TCP transaction flow, all the client-to-server components will be sent to the TCP C-to-S ACTrie and all the server-to-client parts to TCP S-to-C ACTrie. In case of the uni-directional flow classifier disclosed in one or more embodiments of the related '125 application, the complete payload is sent to the appropriate ACTrie such as TCP C-to-S or TCP S-to-C.

(i) Matching terms identification—TBC reads in all the signatures (i.e., the TBTTSM) and constructs separate Aho-Corasick Tries (ACTries) for i) TCP client-to server, ii) TCP server-to-client, iii) UDP client-to-server, and iv) UDP server-to-client. Each payload is broken up into messages (i.e, uni-directional potions of each cell). All the regular expressions corresponding to email/IP addresses, status codes, and URLs are replaced by their tokens. Based on the layer-four protocol type of the payload and the direction of the message, each message is passed to the corresponding ACTrie (in the order in which the messages occur in the payload). The ACTries return the ordered list of matching terms and the set of state machines that contain those terms.

(ii) Matching state machines identification—TBC iterates over each TBTTSM state that is returned as a possible match in the matching terms identification step and traverses the TBTTSM to verify if the payload indeed matches the TBTTSM.

The TBTTSM traversal is guided by maintaining a current term pointer pointing to terms in the ordered list of matching terms (starting with the first term in the list) and a current state pointer pointing to the states in the state machine (starting with the start state). At current state the matching terms are examined starting with current term pointer in the list to identify the first term for which the state has an out transition. If such a transition is found, then the current state pointer is advanced to the end state of the matching transition and the current term pointer is advanced to the term after the matching term. One key constraint in identifying these matching transitions is that the direction of the transition should be the same as the direction of the term in the list. In the case that the directions are different, the transition is not considered to be matching the term. In case there is no matching transition, a dummy transition is taken in the same direction. In the case that there is no such dummy transition at current state, the traversal is backtracked to the closest state on the path from this state to the start state which has such a transition and follow it. In the case that such a state can not be found along the path, the state machine matching is stopped and a match failure is declared. In the case that an accepting state is reached, a match success is declared and the state machine matching continues till a state is reached that has no outgoing transitions (sink state).

TABLE 2 and TABLE 3 show an example payload and TBTTSM matching using the TCP port 25 example shown in FIG. 3.4. Note that for clarity, server-to-client and client-to-server message payloads in the bi-directional flow are shown one after another in TABLE 2. More over, the italicized and underlined annotations are not part of the payload. In other words, TABLE 2 shows a single bi-directional flow payload in four portions: SC message 1, CS message 1, SC message 2, and CS message 2.

TABLE 2
SC Message 1:
220
IMTA01.WESTCHESTER.PA.HMC1.COMCAST.NET
BIZSMTP ESMTP SERVER READY
CS Message 1:
EHLO MAIL.LABSERVICE.IT
SC Message 2:
250—
IMTA01.WESTCHESTER.PA.HMC1.COMCAST.NET
HELLO [85.18.228.219],
PLEASED TO MEET YOU
250—HELP
250—SIZE 30000000
250—ENHANCEDSTATUSCODES
250—8BITMIME
250 OK?
CS Message 2:
MAIL FROM: <DAGA@LABSERVICEIT>BODY=??$?D???R?4??S?cScS?

As noted above in reference to TABLE 1, @_S9S2_@ is a token that stands for any status code, including the actual status codes 220 and 250 found in the example payload of TABLE 2. For matching purposes, these codes 220 and 250 are replaced by @_S9S2_@ during the matching of this example payload and TBTTSM shown in FIG. 3.4. The ordered list of thirteen terms is extracted from TABLE 2 where status codes, URLs, and emails are substituted with their tokens. These substitutions and the direction of each term are included within parentheses for reference. Specifically, the ordered list is as follows:
(i) @_S9S2_@ (representing status code 220, server-to-client)
(ii) @_U7U9_@ (representing IMTA01.WESTCHESTER.PA.HMC1.COMCAST.NET, server-to-client)
(iii) EHLO (client-to-server)
(iv) @_U7U9_@ (representing MAIL. LAB SERVICE. IT, client-to-server)
(v) @_S9S2_@ (representing status code 250, server-to-client)
(vi) @_S9S2_@ (representing status code 250, server-to-client)
(vii) @_S9S2_@ (representing status code 250, server-to-client)
(viii) @_S9S2_@ (representing status code 250, server-to-client)
(ix) @_S9S2_@ (representing status code 250, server-to-client)
(x) @_S9S2_@ (representing status code 250, server-to-client)
(xi) MAIL (client-to-server)
(xii) FROM: (client-to-server)
(xiii) @_E8E7_@ (representing DAGA@LABSERVICE.IT, client-to-server).

Initially in matching the example payload to the TBTTSM example in FIG. 3.4, the current state pointer points to state 0, the current direction is set to server-to-client, and the current term pointer is set to term (i). Since term (i) matches the transition from state 0 to state 1 and the direction of the transition (i.e., solid arrows denotes server-to-client transition) and term is same, the transition is taken, i.e., the state moves to state 1 and the term moves to term (ii). Since next term (ii) does not match the transition out from state 1, it is skipped and the term moves to term (iii), which matches the transition from state 1 to state 2. Since the directions also match (i.e., dashed arrows denotes client-to-server transition), the traversal proceeds to state 2. TABLE 3 shows the complete path that is traversed in this matching procedure.

TABLE 3
220 (State 0-State 1)
EHLO (State 1-State 2)
MAIL.LABSERVICE.IT (State 2-State 3)
250 (State 3-State 4)
MAIL (State 4-State 5)
FROM: (State 5-State 6)
DAGA@LABSERVICE.IT (State 6-Accepting State 7)

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
   identifying, by a processor of a computer system and based on a pre-determined criterion, a training set from a plurality of bi-directional flows obtained from the network traffic, wherein the training set is associated with a network application, wherein each bi-directional flow comprises a sequence of captured payloads exchanged between a server and a client of the network;
   extracting, by the processor and based on a first pre-determined algorithm, a plurality of cells from the plurality of captured payloads, wherein each cell comprises a consecutive portion of the sequence of captured payloads, wherein the consecutive portion comprises at least one direction reversal in a corresponding bi-directional flow;
   analyzing, by the processor and based on a second pre-determined algorithm, a portion of the plurality of cells to calculate a similarity measure representing similarity among cells in the portion of the plurality of cells;
   generating, in response to the similarity measure exceeding a pre-determined threshold, a cell group comprising the portion of the plurality of cells;
   analyzing, by the processor and based on a third pre-determined algorithm, the cell group to generate a signature of the network application; and
   classifying, by the processor and based on the signature of the network application, a new bi-directional flow, separate from the plurality of bi-directional flows, as being generated by the network application.

2. The method of claim 1, wherein the network application comprises a layer-seven application.

3. The method of claim 1, further comprising:
   dividing the cell group to generate a first uni-directional cell group comprising captured payloads sent from servers of the network and a second uni-directional cell group comprising captured payloads sent from clients of the network,
   wherein the signature of the network application is generated from one of the first uni-directional cell group and the second uni-directional cell group.

4. The method of claim 1, further comprising:
   extracting a set of signature terms from the cell group, wherein the set of signature terms are selected from a plurality of substrings extracted from captured payloads of the cell group;
   representing a portion of the captured payloads of the cell group as a plurality of regular expressions, each comprising a sequence of one or more signature terms based on the set of signature terms; and
   representing a first regular expression of the plurality of regular expressions as a first path in a term transition state machine (TTSM), the first path comprising a first state and a second state coupled by a first link, wherein the first link is assigned a first signature term in the set of signature terms and a first transition probability associated with the first signature term, wherein the first transition probability represents probability of signature term transitions into the first signature term in the first regular expression,
   wherein the signature of the network application comprises the TTSM.

5. The method of claim 4, further comprising:
   representing a second regular expression of the plurality of regular expressions as a second path in the TTSM, the second path comprising the first state and a third state coupled by a second link, wherein the second link is assigned a second signature term in the set of signature terms and a second transition probability associated with the second signature term, wherein the second transition probability represents probability of signature term transitions into the second signature term in the second regular expression,
   wherein classifying the new bi-directional flow based on the signature of the network application comprises:
      comparing the first transition probability and the second transition probability to generate a comparison result; and
      traversing the first link in response to the comparison result indicating that the first transition probability exceeds the second transition probability.

6. The method of claim 1, further comprising:
   combining the TTSM and another TTSM generated from another cell group into an overlay state machine; and
   expanding signature terms in the TTSM and the another TTSM in the overlay state machine to form a transaction based TTSM.

7. The method of claim 1, further comprising:
   including the signature of the network application in a signature set of the network application;
   identifying a portion of the plurality of bi-directional flows obtained from the network traffic as failing to be classified based on the signature set of the network application; and
   analyzing the portion of the plurality of bi-directional flows to identify the training set.

8. A system for profiling network traffic of a network, comprising:
   a data collector configured to obtain, from the network traffic, a plurality of bi-directional flows;
   a cell group generator executing on a processor of a computer system and configured to:

identify, from the plurality of bi-directional flows, a training set comprising a plurality of captured payloads corresponding to the plurality of bi-directional flows;

extract, based on a first pre-determined algorithm, a plurality of cells from the plurality of captured payloads, wherein each cell comprises a consecutive portion of the sequence of captured payloads, wherein the consecutive portion comprises at least one direction reversal in a corresponding bi-directional flow;

analyze, based on a second pre-determined algorithm, a portion of the plurality of cells to calculate a similarity measure representing similarity among cells in the portion of the plurality of cells; and generate, in response to the similarity measure exceeding a pre-determined threshold, a cell group comprising the portion of the plurality of cells;

a profiler executing on the processor and configured to identify the training set as associated with a network application;

a signature generator executing on the processor and configured to analyze, based on a third pre-determined algorithm, the cell group to generate a signature of the network application;

a classifier executing on the processor and configured to classify, based on the signature of the network application, a new bi-directional flow, separate from the plurality of bi-directional flows, as being generated by the network application; and a repository configured to store the plurality of cells and the signature of the network application.

9. The system of claim 8, wherein the network application comprises a layer-seven application.

10. The system of claim 8, the cell group generator further configured to:

divide the cell group to generate a first uni-directional cell group comprising captured payloads sent from servers of the network and a second uni-directional cell group comprising captured payloads sent from clients of the network, wherein the signature of the network application is generated from one of the first uni-directional cell group and the second uni-directional cell group.

11. The system of claim 8, the signature generator further configured to:

extract a set of signature terms from the cell group, wherein the set of signature terms are selected from a plurality of substrings extracted from captured payloads of the cell group;

represent a portion of the captured payloads of the cell group as a plurality of regular expressions, each comprising a sequence of one or more signature terms based on the set of signature terms; and represent a first regular expression of the plurality of regular expressions as a first path in a term transition state machine (TTSM), the first path comprising a first state and a second state coupled by a first link, wherein the first link is assigned a first signature term in the set of signature terms and a first transition probability associated with the first signature term, wherein the first transition probability represents probability of signature term transitions into the first signature term in the first regular expression, wherein the signature of the network application comprises the TTSM.

12. The system of claim 11, the signature generator further configured to:

represent a second regular expression of the plurality of regular expressions as a second path in the TTSM, the second path comprising the first state and a third state coupled by a second link, wherein the second link is assigned a second signature term in the set of signature terms and a second transition probability associated with the second signature term, wherein the second transition probability represents probability of signature term transitions into the second signature term in the second regular expression, wherein classifying the new bi-directional flow based on the signature of the network application comprises:

comparing the first transition probability and the second transition probability to generate a comparison result; and traversing the first link in response to the comparison result indicating that the first transition probability exceeds the second transition probability.

13. The system of claim 8, the signature generator further configured to:

combine the TTSM and another TTSM generated from another cell group into an overlay state machine; and expand signature terms in the TTSM and the another TTSM in the overlay state machine to form a transaction based TTSM.

14. The system of claim 8, wherein the signature generator is further configured to include the signature of the network application in a signature set of the network application, and wherein the classifier is further configured to identify a portion of the plurality of bi-directional flows obtained from the network traffic as failing to be classified based on the signature set of the network application, and wherein the cell group generator is further configured to analyze the portion of the plurality of bi-directional flows to identify the training set.

15. A non-transitory computer readable medium embodying instructions for profiling network traffic of a network, the instructions when executed by a processor comprising functionality for:

identifying, based on a pre-determined criterion, a training set from a plurality of bi-directional flows obtained from the network traffic, wherein the training set is associated with a network application, wherein each bi-directional flow comprises a sequence of captured payloads exchanged between a server and a client of the network;

extracting, based on a first pre-determined algorithm, a plurality of cells from the plurality of captured payloads, wherein each cell comprises a consecutive portion of the sequence of captured payloads, wherein the consecutive portion comprises at least one direction reversal in a corresponding bi-directional flow;

analyzing, based on a second pre-determined algorithm, a portion of the plurality of cells to calculate a similarity measure representing similarity among cells in the portion of the plurality of cells;

generating, in response to the similarity measure exceeding a pre-determined threshold, a cell group comprising the portion of the plurality of cells;

analyzing, based on a third pre-determined algorithm, the cell group to generate a signature of the network application; and classifying, based on the signature of the network application, a new bi-directional flow, separate from the plurality of bi-directional flows, as being generated by the network application.

16. The non-transitory computer readable medium of claim 15, wherein the network application comprises a layer-seven application.

17. The non-transitory computer readable medium of claim 15, the instructions when executed by the processor further comprising functionality for:
dividing the cell group to generate a first uni-directional cell group comprising captured payloads sent from servers of the network and a second uni-directional cell group comprising captured payloads sent from clients of the network,
wherein the signature of the network application is generated from one of the first uni-directional cell group and the second uni-directional cell group.

18. The non-transitory computer readable medium of claim 15, the instructions when executed by the processor further comprising functionality for:
extracting a set of signature terms from the cell group, wherein the set of signature terms are selected from a plurality of substrings extracted from captured payloads of the cell group;
representing a portion of the captured payloads of the cell group as a plurality of regular expressions, each comprising a sequence of one or more signature terms based on the set of signature terms; and
representing a first regular expression of the plurality of regular expressions as a first path in a term transition state machine (TTSM), the first path comprising a first state and a second state coupled by a first link, wherein the first link is assigned a first signature term in the set of signature terms and a first transition probability associated with the first signature term, wherein the first transition probability represents probability of signature term transitions into the first signature term in the first regular expression,
wherein the signature of the network application comprises the TTSM.

19. The non-transitory computer readable medium of claim 18, the instructions when executed by the processor further comprising functionality for:
representing a second regular expression of the plurality of regular expressions as a second path in the TTSM, the second path comprising the first state and a third state coupled by a second link, wherein the second link is assigned a second signature term in the set of signature terms and a second transition probability associated with the second signature term, wherein the second transition probability represents probability of signature term transitions into the second signature term in the second regular expression,
wherein classifying the new bi-directional flow based on the signature of the network application comprises:
comparing the first transition probability and the second transition probability to generate a comparison result; and
traversing the first link in response to the comparison result indicating that the first transition probability exceeds the second transition probability.

20. The non-transitory computer readable medium of claim 15, the instructions when executed by the processor further comprising functionality for:
combining the TTSM and another TTSM generated from another cell group into an overlay state machine; and
expanding signature terms in the TTSM and the another TTSM in the overlay state machine to form a transaction based TTSM.

* * * * *